Nov. 23, 1965                J. P. LINDSEY                3,218,843
                              DETONATION METER

Filed March 11, 1963                                    4 Sheets-Sheet 1

INVENTOR.
J. P. LINDSEY
BY
*Young & Quigg*
ATTORNEYS

Nov. 23, 1965 J. P. LINDSEY 3,218,843
DETONATION METER
Filed March 11, 1963 4 Sheets-Sheet 2

INVENTOR.
J. P. LINDSEY
BY *Young & Quigg*
ATTORNEYS

Nov. 23, 1965      J. P. LINDSEY      3,218,843

DETONATION METER

Filed March 11, 1963      4 Sheets-Sheet 3

INVENTOR.
J.P. LINDSEY

BY *Young & Quigg*

ATTORNEYS

Nov. 23, 1965    J. P. LINDSEY    3,218,843
DETONATION METER

Filed March 11, 1963    4 Sheets-Sheet 4

INVENTOR.
J. P. LINDSEY
BY
Young & Quigg
ATTORNEYS

United States Patent Office 3,218,843
Patented Nov. 23, 1965

3,218,843
DETONATION METER
Joe P. Lindsey, Bartlesville, Okla., assignor to Phillips Petroleum Company, a corporation of Delaware
Filed Mar. 11, 1963, Ser. No. 264,126
5 Claims. (Cl. 73—35)

This invention relates to detonation meters for use with internal combustion engines. In one aspect the invention relates to improved method and means for measuring detonation of fuels of 100 octane or more.

In D. R. de Boisblanc, U.S. Patent 2,633,738, issued April 7, 1953, there is disclosed a detonation meter comprising a pickup for converting pressure variations in a cylinder into electrical currents, a filter for attenuating undesired noise components such as those due to valve chatter, an amplifier, and a threshold device for rejecting components in the filtered amplified current of less than a predetermined magnitude. The output of the threshold device consists of voltage waves representative of detonations in the engine cylinder. These voltage waves are amplified and fed to a first pulse generating circuit which transforms each wave into a first exponential pulse which decays exponentially from the peak value of the corresponding voltage wave, and thence to a second pulse generating circuit which transforms the successive exponential pulses into second exponential pulses whose rate of decay is relatively small compared to the first pulses. The output of the second generator is then integrated and fed to a vacuum tube voltmeter which indicates the average intensity of knocking over a preselected period.

For fuels of less than 100 octane, the detonation pulse can be represented as a peak riding upon the crest of the combustion pulse. The threshold device is set to pass only those signals which have a higher amplitude than the combustion pulse, thus blocking the combustion pulse while passing the detonation peak. When the octane number of the test fuel exceeds 100, difficulty is sometimes encountered in obtaining a proper threshold value due to the detonation pulse occurring subsequent to the peak of the combustion pulse to the extent that a threshold value sufficiently low to pass the detonation pulse will also pass a portion of the combustion pulse, thus disrupting the accuracy of the knock readings of the instrument.

In accordance with the invention these difficulties can be overcome by the utilization of a selective time delay circuit to delay the combustion pulse by an amount sufficient to cause the peak of the combustion pulse and the detonation pulse to occur substantially simultaneously.

Accordingly, it is an object of the invention to provide an improved detonation meter. Another object of the invention is to provide a detonation meter having increased accuracy for fuels of over 100 octane. A still further object of the invention is the provision of means which can be utilized with existing detonation meters to increase the accuracy of the readings of the detonation meters for fuels having an octane rating of 100 or higher without requiring extensive modification of the existing detonation meters. Yet another object of the invention is to provide a simple and inexpensive means which can be utilized in combination with existing detonation meters to improve the detonation readings for high octane fuels. Another object of the invention is the provision of an improved method for measuring detonation.

Other objects, aspects and advantages of the invention will be apparent from a study of the disclosure, the drawings and the appended claims to the invention.

In the drawings FIGURE 1 is a block diagram of a detonation meter in accordance with the invention;

Figure 1:
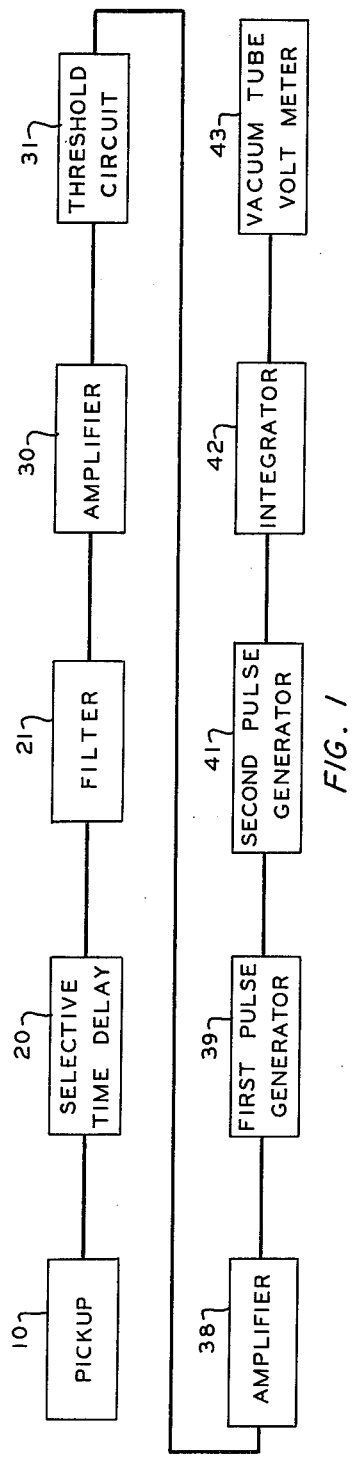
Figure 2:
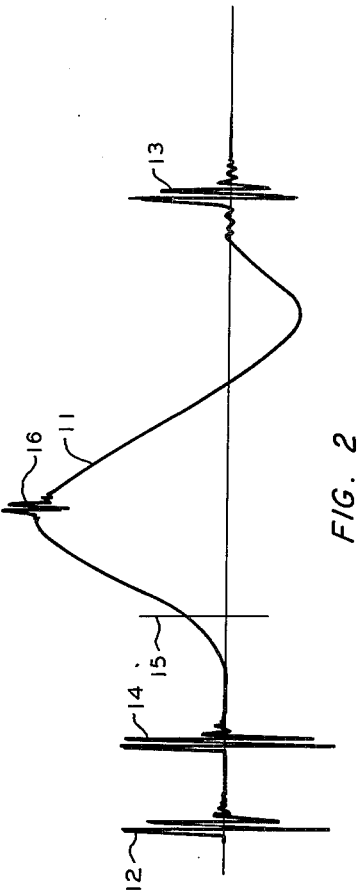
FIGURE 2 is a graph representing a typical waveform of the output of the pickup of a detonation meter for a fuel having an octane rating of less than 100.
Figure 5:
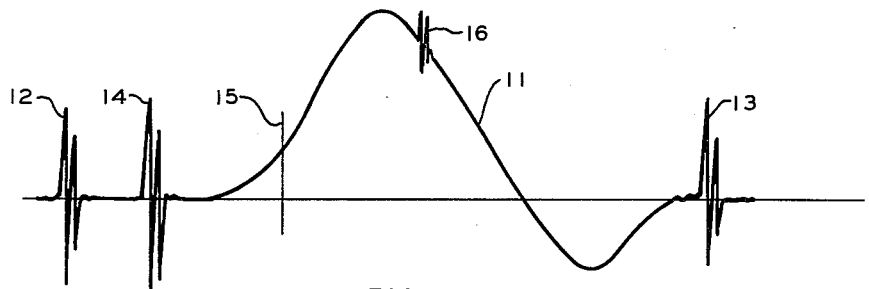
FIGURE 5 is a graph representing a waveform of the output of the pickup of a detonation meter for a fuel having an octane rating of greater than 100.

Referring now to FIGURE 1 of the drawings, there is shown a pickup 10 for converting pressure variations in a cylinder of an internal combustion engine into an electric signal. Such pickups are well known in the art, and hence, no detailed description thereof is believed necessary. Preferably, a magnetostriction type of pickup, such as that shown in Eldredge Patent 2,269,760, is utilized. A typical waveform of the output of pickup 10 for a fuel having an octane rating of less than 100 is illustrated in FIGURE 2 and comprises a main pressure wave 11 representative of the pressure variations caused by normal combustion in the cylinder, pulses 12 and 13 representing the opening and closing of the exhaust valves, pulse 14 representing the operation of the intake valve, pulse 15 representing the ignition of the charge in the cylinder, and pulse 16 representing detonation or knocking in the cylinder. It will be understood that when the engine is operating normally without knocking, the fuel in the cylinder is ignited and the ignition zone spreads uniformly through the cylinder, as indicated by main pressure wave 11. However, when knocking occurs, there is a sudden explosion or detonation in the cylinder and this detonation produces sudden pressure variations of considerable magnitude thereby producing voltage variations in the pickup which are distributed over a wide frequency spectrum. A typical wave form of the output of pickup 10 for a fuel having an octane rating greater than 100 is illustrated in FIGURE 5. A comparison of FIGURES 2 and 5 readily reveals that the detonation pulse in FIGURE 2 is superimposed upon the main pressure wave 11 in the area of the crest or peak thereof, whereas in FIGURE 5 the detonation pulse is superimposed on the main pressure wave 11 but occurs at a time subsequent to the time of occurrence of the peak of main pressure wave 11 to the extent that the maximum amplitude occurring during the detonation is less than the maximum amplitude of the main pressure wave 11.

In accordance with the invention the output of pickup devise 10 is applied to the input of selective time delay 20 wherein the low frequency component, that is, the main pressure wave 11, is delayed for a time sufficient to cause the peak of the main pressure wave 11 and detonation pulse 16 to occur substantially simultaneously in the output of selective time delay 20. The output of selective time delay 20 is fed to a filter 21 whose frequency range is so selected as to attenuate the undesired voltage components 12, 13, 14 and 15 to a considerable extent while permitting the detonation wave to pass therethrough with little relative attenuation. In general it is desired that filter 21 be constructed to pass frequencies below a value in the range of 2000 to 4000 cycles per second and attenuate or substantially eliminate higher frequencies. However it is within the contemplation of the invention to adjust filter 21 so as to pass other bands of frequencies.

Figure 3:
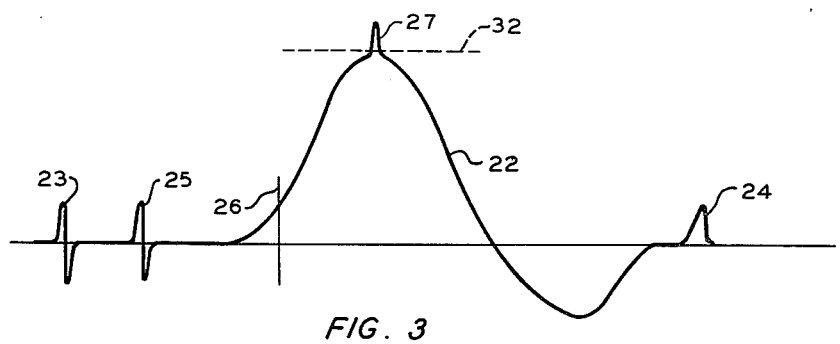
FIGURE 3 is a graph representing the waveform of FIGURE 2 which has been filtered to attenuate undesired noise components.

For a conventional detonation meter not utilizing the selective time delay of the present invention the output of filter 21 corresponding to the wave form of FIGURE 2 is illustrated in FIGURE 3. It will be noted that the main voltage wave 22 is substantially unaffected by passage through filter 21 and has substantially the same shape as main pressure wave 11 of FIGURE 2. However, the voltage pulses 12, 13, 14 and 15 are attenuated by filter 21 and appear respectively as pulses 23, 24, 25 and 26 in the filtered wave. The high frequency components of detonation pulse 16 are attenuated in filter 21 producing pulse 27. However, as filter 21 does not affect the relative time displacement between the high and low frequency components to any appreciable extent the detonation pulse 27 is still riding on the crest of main pressure wave 22.

Figure 6:
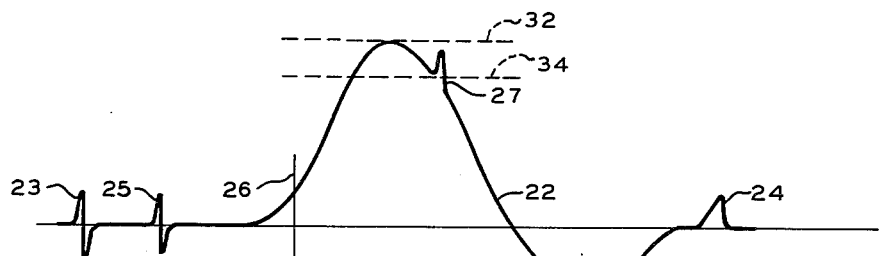
FIGURE 6 is a graph representing the waveform of FIGURE 5 which has been filtered to attenuate undesired noise components.

In a conventional detonation meter not utilizing the selective time delay of the present invention the output of filter 21 corresponding to the wave form of FIGURE 5 is illustrated in FIGURE 6. Again the filtered main pressure wave 22 is substantially unaffected by passage through filter 21 and has substantially the same shape as main pressure wave 11. Also noise components 12, 13, 14, and 15 have been attenuated by passage through filter 21 and are represented in FIGURE 6 by pulses 23, 24, 25 and 26, respectively. The detonation pulse 16 is attenuated to the extent of the reduction or elimination of a portion of high frequency components thereof in its passage through filter 21 and appears as pulse 27 in FIGURE 6. It will be noted that the relationship between the peak of main pressure wave 22 and detonation pulse 27 is unaffected by passage through filter 21 and that the maximum amplitude of the detonation pulse 27 in FIGURE 6 is still less than the amplitude of the peak of main pressure wave 22.

Figure 8:
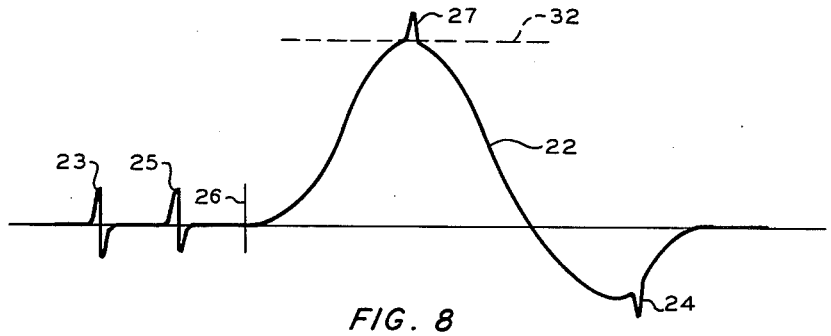
FIGURE 8 is a graph representing the waveform of FIGURE 5 which has been filtered to attenuate undesired noise components and passed through a selective time delay means in accordance with the invention.

In a detonation meter utilizing a selective time delay in accordance with the invention the output of filter 21 corresponding to the wave form of FIGURE 5 is illustrated in FIGURE 8. Main pressure wave 22 is substantially unaffected by passage through selective time delay 20 and filter 21 and has substantially the same shape as main pressure wave 11. As in FIGURES 3 and 6 the noise pulses 12, 13, 14 and 15 have been attenuated by passage through filter 21 and appear as pulses 23, 24, 25 and 26, respectively. Also as in FIGURES 3 and 6 the high frequency detonation pulse 16 is attenuated to produce detonation pulse 27. However unlike FIGURES 3 and 6 the time relationship between the occurrence of pulse 27 and the peak of wave 22 has been affected by passage through selective time relay 20 to the extent that detonation pulse 27 and the peak of main pressure wave 22 occur in FIGURE 8 at substantially the same time. This can be accomplished by selective time delay passing pulses 23, 24, 25, 26 and 27 without any substantial time delay while delaying the passage of main pressure wave 22 by an amount sufficient to cause the peak of wave 22 to occur at substantially the same time as detonation pulse 27.

Figure 4:
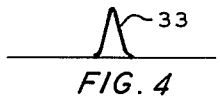
FIGURE 4 is a graph representing the output of the threshold device for the waveform of FIGURE 3.
Figure 7:
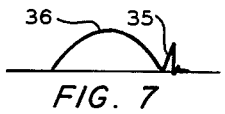
FIGURE 7 is a graph representing the output of the threshold device for the waveform of FIGURE 6.
Figure 9:
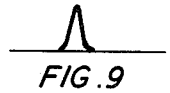
FIGURE 9 is a graph representing the output of the threshold device for the waveform of FIGURE 8.

The output of filter 21 is fed to an amplifier 30 which increases the amplitude of the various voltage components but does not change their wave form appreciably. The amplified signal is then fed to the input of threshold device 31 which eliminates all voltage components of less than a predetermined amplitude. Thus for the wave form of FIGURE 3, threshold device 31 would pass only those amplified voltages corresponding to an input voltage to ampifier 30 greater than the level indicated by line 32, thus producing an output represented by pulse 33 in FIGURE 4. The problem of the time displacement between the detonation pulse and the peak of the main pressure wave for a fuel having an octane rating of greater than 100 encountered by a conventional detonation converter meter is illustrated in FIGURE 6. If threshold device 31 is set to pass only amplified voltages corresponding to an input voltage to amplifier 30 of greater than the value of the peak of the main pressure wave 22, as indicated by line 33, the output of the threshold circuit would be zero, indicating a condition of no knock. If the theshold value for the unamplified signal is lowered sufficiently to pass the detonation pulse as indicated by line 34, the output of threshold device 31 would comprise both the detonation pulse and a portion of the main pressure wave as indicated by pulses 35 and 36, respectively, in FIGURE 7. The problem of a time displacement between the occurrence of the detonation pulse and the peak of the main pressure wave for fuels having an octane value of greater than 100 is eliminated by the incorporation of the selective time delay in the detonation meter in accordance with the present invention as illustrated in FIGURE 8 wherein the unamplified threshold value can again be set at or slightly above the maximum value of the main pressure wave as indicated by line 32 and the output of the threshold circuit will comprise only the detonation pulse, as shown in FIGURE 9.

The output of threshold circuit 31, which is a series of voltage waves each having an amplitude proportional to the peak intensity of the detonation pulse corresponding thereto, is applied to the input of amplifier 38. The amplified pulses are then applied to the input of first pulse generator 39 wherein they are transformed into spaced exponential pulses having amplitudes proportional to the respective peak detonation intensities. These exponential pulses are applied to the input of second pulse generator 41 wherein the spaced pulses are converted into overlapping pulses of longer duration, due to the substantially higher time constant of the pulsing circuit of generator 41 as compared to that of generator 39. The output of second pulse generator 41 has a crest of generally saw-toothed configuration, the peak of each tooth having an amplitude proportional to the peak intensity of the corresponding detonation pulse, and is applied to the input of integrator 42 wherein a smooth steady voltage is produced which is proportional to the average peak detonation intensity indicated by a series or plurality of voltage waves produced by successive detonations in the cylinder. The output of integrator 42 is applied to the input of vacuum tube volt meter 43. Filter 21, amplifier 30, threshold 31, amplifier 38, first pulse generator 39, integrator 42 and volt meter 43 can be any suitable devices known in the art, such as those set forth in U.S. Patent 2,633,738, the description of which is incorporated herein by reference.

Figure 10:
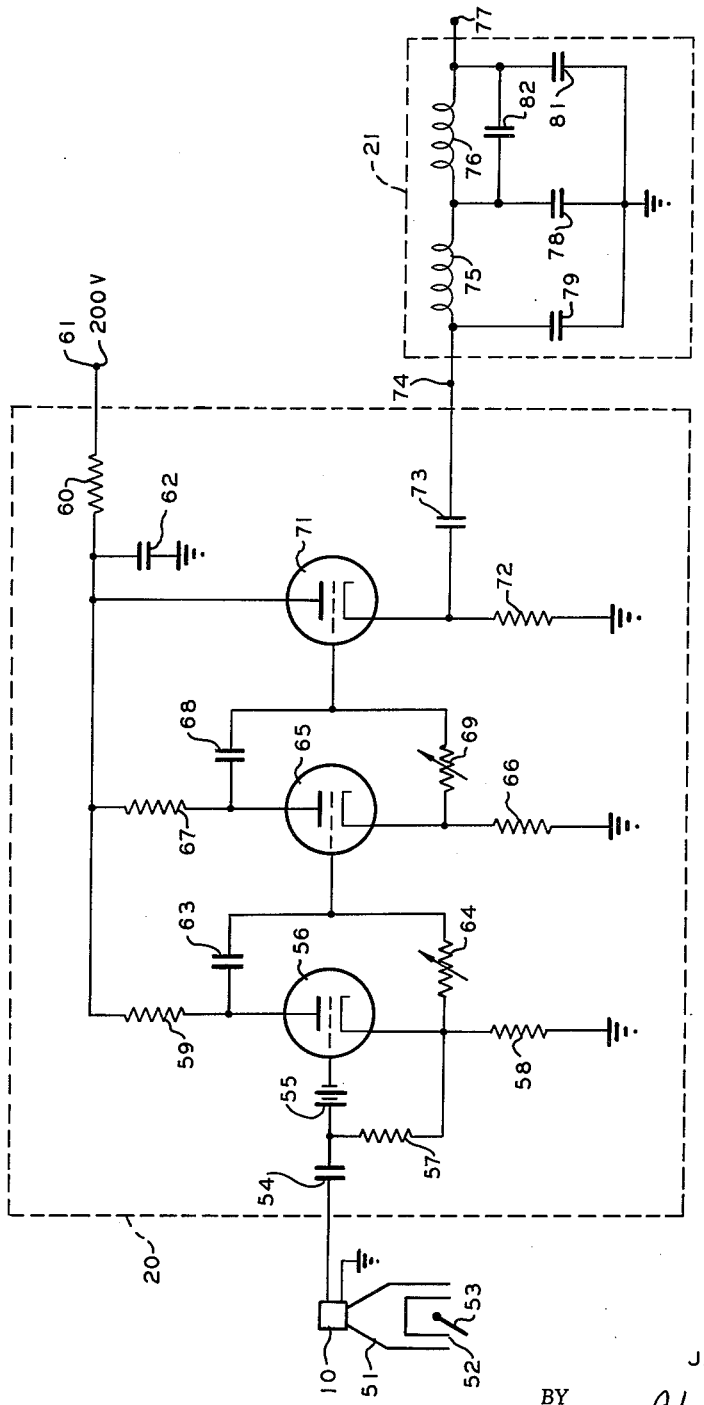
FIGURE 10 is a schematic representation of a selective time delay circuit in accordance with the invention in combination with a detonation pickup device and a noise filtering means.

Referring now to FIGURE 10, pickup device 10 is shown mounted on an engine cylinder 51 having a piston 52 disposed therein which can be reciprocated by piston rod 53. One terminal of pickup device 10 is connected to ground while the other terminal thereof is connected through capacitor 54 and bias voltage source 55 to the grid of triode 56. A resistor 57 is connected between the cathode of triode 56 and the junction between capacitor 54 and bias voltage source 55. The cathode of triode 56 is connected to ground by way of resistor 58 while the anode thereof is connected by way of resistors 59 and 60 to the terminal 61 of a suitable voltage source, such as 200 volts D.C. The junction between resistors 59 and 60 is connected to ground by way of capacitor 62 to furnish an A.C. bypass to ground. The anode of triode 56 is connected by way of capacitor 63 and variable resistor 64 to the cathode thereof with the junction between capacitor 63 and resistor 64 being connected to the grid of triode 65. The cathode of triode 65 is connected to ground by way of resistor 66 while the anode thereof is connected by way of resistors 67 and 60 to terminal 61. The anode of triode 65 is connected by way of capacitor 68 and variable resistor 69 to the cathode thereof with the junction between capacitor 68 and resistor 69 being connected to the grid of triode 71. The anode of triode 71 is connected through resistor 60 to terminal 61 while the cathode of triode 71 is connected to ground by way of resistor 72. The cathode of triode 71 is connected by way of capacitor 73 to the input terminal 74 of filter 21. Filter 21 comprises inductances 75 and 76 connected between input terminal 74 and an output terminal 77 with the junction between inductances 75 and 76 being connected to ground by way of capacitor 78. Input terminal 74 is connected to ground by way of capacitor 79 while the output terminal 77 is connected to ground by way of capacitor 81. Capacitor 82 is connected in parallel with inductance 76. Output terminal 77 is connected to the input terminal of amplifier 30 (FIGURE 1).

Variable resistors 64 and 69 can be manipulated to vary the length of time by which the main pressure wave signal is delayed with respect to the detonation pulse. While the selective time delay circuit has been described as utilizing RC circuits to effect the selective time delay, it is within the contemplation of the invention to utilize suitable RL or RLC circuits. While the selective time delay circuit has been described as utilizing triodes, it is within the contemplation of the invention to use tetrodes, pentodes, etc., and/or transistors. Any suitable number of stages can be utilized in selective time delay 20. Also, while the invention has been illustrated with the selective time delay circuit connected between pickup 10 and filter 21, it is only necessary that the output of the pickup be passed through the selective time delay circuit prior to being applied to the input of the threshold circuit; thus, selective time delay circuit 20 can be connected between filter 21 and amplifier 30 or between amplifier 30 and threshold circuit 31. It is an advantage of the invention that the selective time delay circuit can be utilized between the pickup 10 and filter 21 as this permits the use of the selective time delay circuit with existing detonation meters without requiring any circuit modification of the existing meters. While the selective time delay means has been illustrated as comprising two vacuum tubes having an RC network between their plates and cathodes, and a cathode follower, it is within the contemplation of the invention to utilize any suitable means for delaying the low frequency main pressure wave with respect to the high frequency detonation pulse. It is presently preferred to utilize an "all pass" circuit such as illustrated in FIGURE 10, that is, one which passes all frequencies without amplitude attenuation; however it is within the scope of the invention to utilize a selective time delay circuit which does selectively attentuate amplitudes and even to combine the selective time delay of delay 20 with the selective amplitude attenuation of filter 21 in a single circuit.

The following specific values of the components of the selective time delay circuit are presented for purposes of illustration and are not to be construed as unduly limiting the invention:

| | |
|---|---|
| Capacitors 54, 73 | .01 mfd. |
| Battery 55 | 1.5 volts. |
| Triodes 56, 65, 71 | ½ of 12AX7. |
| Resistors 57, 64, 69 | 1 meg ohm. |
| Resistors 58, 59, 66, 67, 72 | 10K ohm. |
| Resistor 60 | 20K ohm. |
| Capacitor 62 | 12 mfd. |
| Capacitors 63, 68 | .001 mfd. |

Reasonable variation and modification are possible within the scope of the foregoing disclosure, the drawing, and the appended claims to the invention.

I claim:

1. In a detonation meter comprising means for converting pressure variations in an engine cylinder into electrical current comprising voltage components representative of unwanted vibrations, voltage components representative of the main pressure variations in the cylinder, and voltage waves representative of detonation, each voltage wave having an amplitude proportional to the peak intensity of a detonation in the cylinder, a filter for attenuating said unwanted voltage components, the output of said filter including the voltage components representative of the main pressure variations with pips projecting therefrom representing the respective detonation voltage waves, a threshold circuit for eliminating voltages of less than a predetermined amplitude whereby the output of said threshold circuit comprises a series of pulses, and means responsive to said series of pulses for producing an output signal representative of the average peak detonation intensity; the improvement comprising means for selectively delaying the voltage components representative of the main pressure variations in the cylinder with respect to the voltage waves representative of detonation so that the peak of each of said voltage components representative of the main pressure variations and the respective one of said voltage waves representative of detonation occur at substantially the same time, means for connecting said means for selectively delaying and said filter in series between the output of said means for converting and an input of said threshold circuit so as to effect the delay between the voltage components representative of the main pressure variations and the voltage waves representative of detonation prior to the passing of said voltage components representative of main pressure variations and said voltage waves representative of detonation to said input of said threshold circuit.

2. A detonation meter comprising means for converting pressure variations in an engine cylinder into electrical current comprising voltage components representative of unwanted vibrations, voltage components representative of the main pressure variations in the cylinder, and voltage waves representative of detonation, each voltage wave having an amplitude proportional to the peak intensity of a detonation in the cylinder; a low-pass filter for attenuating said unwanted voltage components, the output of said filter including the voltage components representative of the main pressure variations with pips projecting therefrom representing the respective detonation voltage waves; a threshold circuit for eliminating voltages of less than a predetermined amplitude which is slightly greater than the peak amplitude of the voltage components representative of the main pressure variations fed to the threshold circuit whereby the output of said threshold circuit comprises a series of pulses; means for connecting the output of said filter to an input of said threshold circuit, a first pulsing circuit for producing spaced exponential pulses each having an amplitude proportional to the respective one of said series of pulses; a second pulsing circuit for producing overlapping pulses each having an amplitude proportional to the respective one of said spaced exponential pulses; means for integrating said overlapping pulses to produce an output signal; and means connected between said means for converting and said low-pass filter for selectively delaying the voltage components representative of the main pressure variations in the cylinder with respect to the voltage waves representative of detonation so that the peak of each of said voltage components representative of the main pressure variations and the respective one of said voltage waves representative of detonation occur at substantially the same time.

3. In a detonation meter comprising means for converting pressure variations in an engine cylinder into electrical current comprising voltage components representative of unwanted vibrations, voltage components representative of the main pressure variations in the cylinder, and voltage waves representative of detonation, each voltage wave having an amplitude proportional to the peak intensity of a detonation in the cylinder, a low-pass filter for attenuating said unwanted voltage components, the output of said filter including the voltage components representative of the main pressure variations with pips projecting therefrom representing the respective detonation voltage waves, a threshold circuit for eliminating voltages of less than a predetermined amplitude which is slightly greater than the peak amplitude of the voltage component representative of the main pressure variations fed to the threshold circuit whereby the output of said threshold circuit comprises a series of pulses, means for connecting the output of said filter to an input of said threshold circuit, a first pulsing circuit for producing spaced exponential pulses each having an amplitude proportional to the respective one of said series of pulses, a second pulsing circuit for producing overlapping pulses each having an amplitude proportional to the respective one of said spaced exponential pulses, and means for integrating said overlapping pulses to produce an output signal; the improvement comprising a first triode, a first capacitor and a bias voltage source connected in series between one output terminal of said means for converting and the grid of said first triode, means for connecting the second output terminal of said means for converting to ground, a first resistor connected between the cathode of said first triode and ground, a second resistor connected between the cathode of said first triode and the junction between said first capacitor and said bias voltage source, third and fourth resistors connected in series between the anode of said first triode and a suitable source of D.C. voltage, a second capacitor connected between ground and the junction between said third and fourth resistors, a third capacitor and a first variable resistor connected in series between the anode and cathode of said first triode, a second triode, means connecting the junction between said third capacitor and said first variable resistor to the grid of said second triode, a fifth resistor connected between ground and the cathode of said second triode, a sixth resistor connected between the anode of said second triode and the junction between said third and fourth resistors, a fourth capacitor and a second variable resistor connected in series between the anode of said second triode and the cathode of said second triode, a third triode, means connecting the junction between said fourth capacitor and said second variable resistor to the grid of said third triode, means connecting the anode of said third triode to the junction between said third and fourth resistors, a seventh resistor connected between ground and the cathode of said third triode, and a fifth capacitor connected between the cathode of said third triode and an input terminal of said low-pass filter.

4. In a detonation meter comprising means for converting pressure variations in an engine cylinder into electrical current comprising voltage components representative of unwanted vibrations, voltage components representative of the main pressure variations in the cylinder, and voltage waves representative of detonation, each voltage wave having an amplitude proportional to the peak intensity of a detonation in the cylinder, a filter for attenuating said unwanted voltage components, the output of said filter including the voltage components representative of the main pressure variations with pips projecting therefrom representing the respective detonation voltage waves, a threshold circuit having an input connected to the output of said filter for eliminating voltages of less than a predetermined amplitude whereby the output of said threshold circuit comprises a series of pulses, and means responsive to said series of pulses for producing an output signal representative of the average peak detonation intensity; the inmprovement comprising means for selectively delaying the voltage components representative of the main pressure variations in the cylinder with respect to the voltage waves representative of detonation so that the peak of each of said voltage components representative of the main pressure variations and the respective one of said voltage waves representative of detonation occur at substantially the same time, said means for selectively delaying being connected between the output of said means for converting and an input of said filter so as to effect the delay between the voltage components representative of the main pressure variations and the voltage waves representative of detonation prior to the passing of said voltage components representative of main pressure variations and said voltage waves representative of detonation to an input of said threshold circuit.

5. In a detonation meter comprising means for converting pressure variations in an engine cylinder into electrical current comprising voltage components representative of unwanted vibrations, voltage components representative of the main pressure variations in the cylinder, and voltage waves representative of detonation, each voltage wave having an amplitude proportional to the peak intensity of a detonation in the cylinder, a low-pass filter for attenuating said unwanted voltage components, the output of said filter including the voltage components representative of the main pressure variations with pips projecting therefrom representing the respective detonation voltage waves, a threshold circuit for eliminating voltages of less than a predetermined amplitude which is slightly greater than the peak amplitude of the voltage components representative of the main pressure variations fed to the threshold circuit whereby the output of said threshold circuit comprises a series of pulses, a first pulsing circuit for producing spaced exponential pulses each having an amplitude proportional to the respective one of said series of pulses, a second pulsing circuit for producing overlapping pulses each having an amplitude proportional to the respective one of said spaced exponential pulses, and means for integrating said overlapping pulses to produce an output signal; the improvement including a selective time delay means for selectively delaying the voltage components representative of the main pressure variations in the cylinder with respect to the voltage waves representative of detonation so that the peak of each of said voltage components representative of the main pressure variations and the respective one of the voltage waves representative of detonation occur at substantially the same time, said selective time delay means comprising a first triode, first and second input terminals, a first capacitor and a bias voltage source connected in series between said first input terminal and the grid of said first triode, means for connecting said second input terminal to ground, a first resistor connected between the cathode of said first triode and ground, a second resistor connected between the cathode of said first triode and the junction between said first capacitor and said bias voltage source, third and fourth resistors connected in series between the anode of said first triode and a suitable source of D.C. voltage, a second capacitor connected between ground and the junction between said third and fourth resistors, a third capacitor and a first variable resistor connected in series between the anode and cathode of said first triode, a second triode, means connecting the junction between said third capacitor and said first variable resistor to the grid of said second triode, a fifth resistor connected between ground and the cathode of said second triode, a sixth resistor connected between the anode of said second triode and the junction between said third and fourth resistors, a fourth capacitor and a second variable resistor connected in series between the anode of said second triode and the cathode of said second triode, a third triode means connecting the junction between said fourth capacitor and said second variable resistor to the grid of said third triode, means connecting the anode of said third triode to the junction between said third and fourth resistors, a seventh resistor connected between ground and the cathode of said third triode, an output terminal, a fifth capacitor connected between the cathode of said third triode and said output terminal; and means for connecting said filter and said selective time delay means in series between the output of said means for converting and an input of said threshold circuit so as to effect the delay between the voltage components representative of the main pressure variations and the voltage waves representative of detonation prior to the passing of said voltage components representative of main pressure variations and said voltage waves representative of detonation to an input of said threshold circuit.

References Cited by the Examiner
UNITED STATES PATENTS

| | | | |
|---|---|---|---|
| 2,633,738 | 4/1953 | De Boisblanc | 73—35 |
| 2,679,746 | 6/1954 | De Boisblanc | 73—35 |

RICHARD C. QUEISSER, *Primary Examiner.*